I. H. BABCOCK.
PNEUMATIC CUSHIONED WHEEL.
APPLICATION FILED SEPT. 21, 1911.
1,040,114.
Patented Oct. 1, 1912.
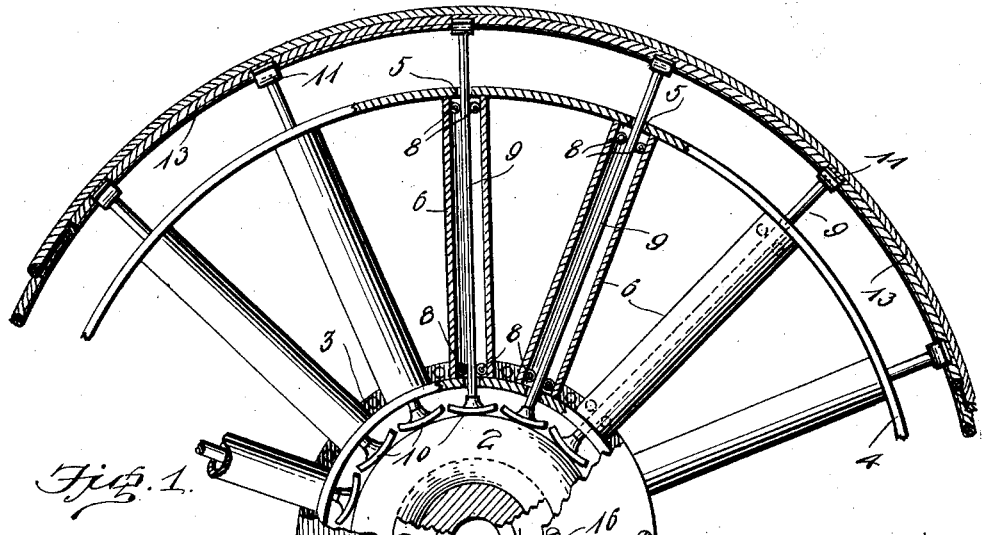
Fig. 1.
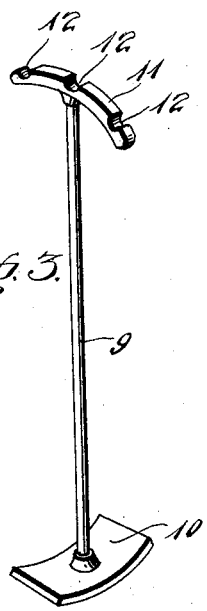
Fig. 2.
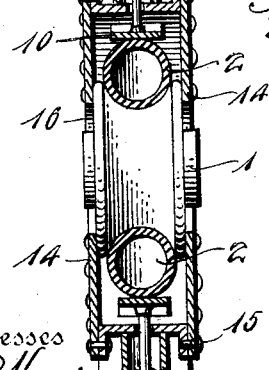
Fig. 3.
Fig. 4.
Witnesses
C. E. Hunt
O. W. B. Somers
Inventor
I. H. Babcock
by H. B. Wilson &co
Attorneys
COLUMBIA PLANOGRAPH CO., WASHINGTON, D. C.

UNITED STATES PATENT OFFICE.

IRWIN H. BABCOCK, OF DE RUYTER, NEW YORK, ASSIGNOR OF ONE-HALF TO LYMAN A. COON, OF DE RUYTER, NEW YORK.

PNEUMATIC-CUSHIONED WHEEL.

1,040,114.  Specification of Letters Patent.  Patented Oct. 1, 1912.

Application filed September 21, 1911. Serial No. 650,631.

*To all whom it may concern:*

Be it known that I, IRWIN H. BABCOCK, a citizen of the United States, residing at De Ruyter, in the county of Madison and State of New York, have invented certain new and useful Improvements in Pneumatic-Cushioned Wheels; and I do declare the following to be a full, clear, and exact description of the invention, such as will enable others skilled in the art to which it appertains to make and use the same.

This invention relates to improvements in pneumatic cushioned wheels.

One object of the invention is to provide a wheel of this character having an improved construction and arrangement of pneumatic cushioned rim and spokes adapted to provide an elastic or yielding tread for the wheel without danger of puncturing the cushioning device.

Another object is to provide a wheel of this character having all the advantages of a pneumatic tired wheel, which will not slip or skid and which is free from the many other disadvantages found in pneumatic tired wheels.

With these and other objects in view the invention consists of certain novel features of construction, and the combination and arrangement of parts as will be more fully described and claimed.

In the accompanying drawings; Figure 1 is a side view of a portion of a wheel constructed in accordance with the invention, parts of the same being broken away and in section; Fig. 2 is a vertical cross sectional view through the parts shown in Fig. 1; Fig. 3 is a detail perspective view of one of the yieldingly supported spokes of the wheel; Fig. 4 is an enlarged cross sectional view through one of the spokes and its guiding and supporting sleeve showing the manner in which the spoke is slidably supported in the sleeve.

In the embodiment of the invention, I provide a hub 1 which preferably has its periphery or outer surface grooved to form a curved seat for an annular pneumatic cushion 2 comprising an endless elastic tube which is engaged with the grooved periphery of the hub and is designed to be inflated in any suitable manner. Arranged around and spaced a suitable distance from the annular pneumatic cushion or tube 2 is an inner spoke guiding and holding band 3, while around said band 3 and spaced a considerable distance therefrom are outer spoke guiding and holding bands 4, said bands being arranged concentrically and having formed therein oppositely disposed spoke receiving passages 5 with which are slidably engaged the cushioned spokes of the wheel as will be hereinafter more fully described. Between the inner and outer bands 3 and 4 and in line with the passages 5 are secured spoke guiding and supporting sleeves 6 in which, adjacent to their inner and outer ends are formed pairs of right angular bearing lugs 7. In the lugs 7 are secured the shafts of grooved spoke guiding and supporting rollers 8 which engage the opposite sides of the spokes 9 and slidably support the same in the sleeve and permit the same to freely slide through the passages 5 in the bands 3 and 4 of the wheel.

The spokes 9 are in the form of cylindrical rods on the inner ends of which are secured segmental or slightly curved plates 10 which engage and press against the pneumatic cushion 2 around the hub of the wheel as clearly shown in Figs. 1 and 2 of the drawings. The blades 10 are nearly or fully as wide as the cushion 2 so as to bear reliably upon it when it is compressed to a considerable extent, and their curvature is in the plane of the wheel and hence of the cushion so that the latter will not be injured by the corners of the plate pressing upon it. The outer ends of the spokes 9 project a suitable distance beyond the outer band 4 and have secured thereto heads 11 in the form of slightly curved bars which project on opposite sides of the spokes and have formed in their outer surface a plurality of notches or recesses 12 of which there may be any suitable number, said notches or recesses being provided to receive and hold in place a plurality of endless wire cables 13 which when engaged with said heads form the tire of the wheel. The heads or bars 11 curve transversely of the wheel so that each stands in a plane at right angles to the curvature of the blades 10, the obvious purpose being to make the tire or tread of the wheel slightly rounding. The cables 13 are preferably formed of fine strands of woven or twisted wire and when engaged with the heads 11 of the spokes provide a flexible tire which cannot be readily injured by passing over rough surfaces or sharp objects and which will positively prevent the wheel from skidding or slipping. By constructing and arranging the spokes and tire as herein shown and described it will be seen that when pressure is applied to the tire it will be imparted through the spokes to the pneumatic cushion which will form a yielding support and will absorb all shocks and jars to which the wheel may be subjected in passing over rough or uneven surfaces. The pneumatic tube or cushion 2 and the inner ends of the spokes are preferably covered by annular side plates 14 which are secured to the flanged outer edges of the inner band 3, and to the hub 1, one of said plates being removably secured by screws 15 or other suitable fastening devices. In the center of each of the plates 14 is formed a circular opening 16 of sufficient size to permit the ends of the hub to project through the plates.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is;

1. In a pneumatic cushioned wheel, a hub, an endless pneumatic cushion arranged around said hub, inner and outer bands around said cushion and having alined passages, sleeves between and secured to the bands with their ends communicating with said passages, lugs in each sleeve, two rollers journaled between said lugs and having grooved peripheries defining an opening registering with said passages, spokes passing loosely through said passages and sleeves and guided through the openings between said rollers, segmental plates secured on the inner ends of the spokes and curved in the plane of said cushion against which they rest, heads secured on the outer ends of said spokes and curved in a plane at right angles to that mentioned, and a flexible rim passing around all said heads.

2. In a pneumatic cushioned wheel, a hub, an endless pneumatic cushion around said hub, inner and outer bands surrounding and concentric with said cushion and having alined passages, sleeves between and secured to the bands with their ends communicating with said passages, two rollers mounted in each sleeve and having grooved peripheries defining an opening registering with said passages, spokes passing loosely through said passages and sleeves and guided through the openings between said rollers, plates secured on the inner ends of the spokes and curved in the plane of said cushion against which they rest, and a flexible rim passing around the outer ends of all said spokes.

In testimony whereof I have hereunto set my hand in presence of two subscribing witnesses.

IRWIN H. BABCOCK.

Witnesses:
LEON B. CLARK,
E. J. POOL.

.ies of this patent may be obtained for five cents each, by addressing the "Commissioner of Patents, Washington, D. C."